(12) United States Patent
Li et al.

(10) Patent No.: US 11,993,054 B2
(45) Date of Patent: May 28, 2024

(54) METHOD OF PREPARING GYPSUM WALLBOARD FROM HIGH SALT GYPSUM, AND RELATED PRODUCT

(71) Applicant: United States Gypsum Company, Chicago, IL (US)

(72) Inventors: Qinghua Li, Rolling Meadows, IL (US); Mark K. Hemphill, Hawthorn Woods, IL (US)

(73) Assignee: United States Gypsum Company, Chicago, IL (US)

( * ) Notice: Subject to any disclaimer, the term of this patent is extended or adjusted under 35 U.S.C. 154(b) by 8 days.

(21) Appl. No.: 16/904,729

(22) Filed: Jun. 18, 2020

(65) Prior Publication Data

US 2021/0129490 A1 May 6, 2021

Related U.S. Application Data

(60) Provisional application No. 62/930,965, filed on Nov. 5, 2019.

(51) Int. Cl.
*B32B 13/04* (2006.01)
*B32B 9/02* (2006.01)
(Continued)

(52) U.S. Cl.
CPC ............... *B32B 13/04* (2013.01); *B32B 9/02* (2013.01); *C04B 28/14* (2013.01);
(Continued)

(58) Field of Classification Search
CPC ....... Y10T 428/24942; Y10T 428/2495; Y10T 428/24967; Y10T 428/24983;
(Continued)

(56) References Cited

U.S. PATENT DOCUMENTS

| 649,363 A | 5/1900 | Ryan |
| 654,024 A | 7/1900 | Ryan |

(Continued)

FOREIGN PATENT DOCUMENTS

| AT | 355272 B | 2/1980 |
| AU | 2008249236 B2 | 12/2008 |

(Continued)

OTHER PUBLICATIONS

U.S. Appl. No. 62/930,965, Li et al., filed Nov. 5, 2019.

(Continued)

*Primary Examiner* — Maria V Ewald
*Assistant Examiner* — Ethan A. Utt
(74) *Attorney, Agent, or Firm* — Leydig, Voit & Mayer, Ltd.; Philip T. Petti; Pradip K. Sahu

(57) ABSTRACT

Disclosed are a composite gypsum board and a method of preparing composite gypsum board. The board contains set gypsum layers sandwiched between two cover sheets. The set gypsum layers are formed from at least stucco and water. The set gypsum layers include a board core and one or more skim coat layers. The set gypsum core makes up a substantial thickness (e.g., at least about 90%, at least about 92%, at least about 95%, or at least about 97%) of the total thickness of all the gypsum layers. A first skim coat layer is included on one side of the core, facing a first (face) cover sheet. A second skim coat layer is included on the other side of the core, facing a second (back) cover sheet. At least the second skim layer is formed from a slurry that contains starch. The stucco material generally includes a high salt impurity content, for example, when the stucco is calcined from certain sources of low-quality synthetic gypsum. For example, in some embodiments, the salts are chloride salts, e.g., sodium chloride (NaCl), potassium chloride (KCl), (Continued)

magnesium chloride (MgCl$_2$), and/or calcium chloride (CaCl$_2$).

20 Claims, 5 Drawing Sheets

(51) Int. Cl.
  *C04B 28/14* (2006.01)
  *C04B 111/00* (2006.01)
(52) U.S. Cl.
  CPC ....... *B32B 2250/05* (2013.01); *B32B 2250/40* (2013.01); *B32B 2315/18* (2013.01); *B32B 2317/20* (2013.01); *B32B 2607/00* (2013.01); *C04B 2111/0062* (2013.01)
(58) Field of Classification Search
  CPC ... Y10T 428/24992; Y10T 428/249953; Y10T 428/249954; Y10T 428/249967; Y10T 428/249968; Y10T 428/249982; Y10T 428/249985; Y10T 428/26; Y10T 428/263; Y10T 428/264; Y10T 428/265; Y10T 428/266; Y10T 428/27; Y10T 428/273; Y10T 428/277; Y10T 428/31971; Y10T 428/31993; Y10T 428/31996; B32B 5/00; B32B 5/18; B32B 5/20; B32B 7/00; B32B 7/02; B32B 7/022; B32B 7/04; B32B 7/12; B32B 13/00; B32B 13/04; B32B 13/08; E04B 1/00; E04B 1/02; E04B 1/04; E04B 1/62; E04B 2/00; E04B 2/02; E04B 2/72; E04B 2/723; E04B 2103/02; E04C 2/00; E04C 2/02; E04C 2/043; E04C 2/049; E04C 2/44; E04C 2/46; C04B 1/00; C04B 28/14; C04B 2111/10; C04B 2111/1025
  USPC ....... 428/212, 213, 215, 217, 218, 219, 220, 428/304.4, 305.5, 312.2, 312.4, 317.1, 428/317.7, 332, 334–337, 340–342, 532, 428/537.5, 537.7, 688, 389, 699, 701, 428/702, 703; 106/638, 672, 680, 772, 106/783, 819, 820
  See application file for complete search history.

(56) References Cited

U.S. PATENT DOCUMENTS

| | | | |
|---|---|---|---|
| 1,190,431 A | 7/1916 | Linkletter et al. |
| 1,439,954 A | 12/1922 | Emerson |
| 2,080,009 A | 1/1925 | Roos |
| 1,568,314 A | 1/1926 | Buttress et al. |
| 1,890,674 A | 12/1932 | Delaney |
| 2,017,022 A | 10/1935 | Roos |
| 2,078,199 A | 4/1937 | King |
| 2,213,249 A | 9/1940 | Kelley et al. |
| 2,215,241 A | 9/1940 | Eichelberger et al. |
| 2,239,107 A | 4/1941 | Lefebure |
| 2,278,455 A | 4/1942 | Linzell et al. |
| 2,310,216 A | 2/1943 | Crandell |
| 2,879,662 A | 3/1959 | Spinelli |
| 3,382,636 A | 5/1968 | Green |
| 3,389,042 A | 6/1968 | Bieri et al. |
| 3,516,882 A | 6/1970 | Cummisford |
| 3,573,947 A | 4/1971 | Kinkade et al. |
| 4,009,062 A | 2/1977 | Long |
| 4,042,739 A | 8/1977 | Emal et al. |
| 4,051,291 A | 9/1977 | Long |
| 4,117,183 A | 9/1978 | Long |
| 4,327,146 A | 4/1982 | White |
| 4,372,814 A | 2/1983 | Johnstone et al. |
| 4,518,652 A | 5/1985 | Willoughby |
| 4,544,424 A | 10/1985 | Take et al. |
| 5,047,282 A | 9/1991 | Mier |
| 5,246,677 A | 9/1993 | Moser et al. |
| 5,256,222 A | 10/1993 | Shepherd et al. |
| 5,342,566 A | 8/1994 | Schäfer et al. |
| 5,520,779 A | 5/1996 | Bold |
| 5,643,510 A | 7/1997 | Sucech |
| 5,683,635 A | 11/1997 | Sucech et al. |
| 5,798,425 A | 8/1998 | Albrecht et al. |
| 6,342,284 B1 * | 1/2002 | Yu ............................ E04C 2/04 |
| | | | 106/785 |
| 6,409,824 B1 | 6/2002 | Veeramasuneni et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,694,695 B2 | 2/2004 | Collins et al. |
| 6,777,517 B1 | 8/2004 | Albrecht et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,244,304 B2 | 7/2007 | Yu et al. |
| 7,364,676 B2 | 4/2008 | Sucech et al. |
| 7,414,085 B2 | 8/2008 | Colbert et al. |
| 7,473,474 B2 | 1/2009 | Toreki et al. |
| 7,731,794 B2 | 6/2010 | Yu et al. |
| 7,736,720 B2 | 6/2010 | Yu et al. |
| 7,758,980 B2 | 7/2010 | Yu et al. |
| 7,776,170 B2 | 8/2010 | Yu et al. |
| 7,799,169 B2 | 9/2010 | Bhat et al. |
| 8,038,790 B1 | 10/2011 | Dubey et al. |
| 8,133,600 B2 | 3/2012 | Wang et al. |
| 8,142,914 B2 | 3/2012 | Yu et al. |
| 8,257,489 B2 | 9/2012 | Yu et al. |
| 8,262,820 B2 | 9/2012 | Yu et al. |
| 8,303,159 B2 | 11/2012 | Yu et al. |
| 8,323,785 B2 | 12/2012 | Yu et al. |
| 8,398,764 B2 | 3/2013 | Mahoney et al. |
| 8,464,493 B2 | 6/2013 | Boone et al. |
| 8,470,461 B2 | 6/2013 | Yu et al. |
| 9,945,119 B2 | 4/2018 | Aldabaibeh et al. |
| 10,399,904 B2 | 9/2019 | Ironside et al. |
| 11,186,066 B2 | 11/2021 | Hemphill et al. |
| 11,186,067 B2 | 11/2021 | Hemphill et al. |
| 2002/0045074 A1 | 4/2002 | Yu et al. |
| 2002/0096280 A1 | 7/2002 | Jones et al. |
| 2004/0048110 A1 | 3/2004 | Butler |
| 2005/0067082 A1 | 3/2005 | Mowry |
| 2006/0035112 A1 | 2/2006 | Veeramasuneni et al. |
| 2007/0023118 A1 | 2/2007 | Spielvogel |
| 2007/0048490 A1 | 3/2007 | Yu et al. |
| 2007/0102237 A1 | 5/2007 | Baig et al. |
| 2007/0141304 A1 | 6/2007 | Agrawal |
| 2007/0148430 A1 | 6/2007 | Agrawal |
| 2007/0149078 A1 | 6/2007 | Nandi et al. |
| 2007/0255032 A1 | 11/2007 | Bichler et al. |
| 2008/0086957 A1 | 4/2008 | Averill |
| 2008/0087366 A1 * | 4/2008 | Yu ............................ C04B 28/14 |
| | | | 156/39 |
| 2008/0090068 A1 | 4/2008 | Yu et al. |
| 2008/0176053 A1 | 7/2008 | Miller et al. |
| 2008/0275167 A1 | 11/2008 | Colbert et al. |
| 2010/0047461 A1 | 2/2010 | Colbert |
| 2010/0247937 A1 | 9/2010 | Liu et al. |
| 2012/0113124 A1 | 5/2012 | Lecerf et al. |
| 2012/0168527 A1 | 7/2012 | Li et al. |
| 2012/0170403 A1 | 7/2012 | Li et al. |
| 2014/0000979 A1 | 1/2014 | Dugan et al. |
| 2014/0113124 A1 * | 4/2014 | Sang ....................... E04C 2/043 |
| | | | 156/39 |
| 2014/0113128 A1 | 4/2014 | Sang et al. |
| 2015/0000558 A1 | 1/2015 | Ha et al. |
| 2015/0010767 A1 | 1/2015 | Sang et al. |
| 2015/0306846 A1 | 10/2015 | Xu et al. |
| 2015/0368164 A1 | 12/2015 | Gehrig et al. |
| 2016/0258157 A1 | 9/2016 | Yu et al. |
| 2016/0375651 A1 | 12/2016 | Li et al. |
| 2016/0375655 A1 | 12/2016 | Li et al. |
| 2017/0008192 A1 | 1/2017 | Kawamura et al. |
| 2017/0030076 A1 | 2/2017 | Li et al. |

(56) References Cited

U.S. PATENT DOCUMENTS

| | | |
|---|---|---|
| 2017/0096366 A1 | 4/2017 | Vilinska et al. |
| 2017/0096369 A1 | 4/2017 | Vilinska et al. |
| 2017/0152177 A1 | 6/2017 | Vilinska et al. |
| 2017/0166792 A1 | 6/2017 | Ayambem |
| 2017/0183868 A1 | 6/2017 | Yu et al. |
| 2017/0240467 A1 | 8/2017 | Gehrig et al. |
| 2017/0246838 A1 | 8/2017 | Rohlf |
| 2017/0362124 A1 | 12/2017 | Sang et al. |
| 2018/0065336 A1 | 3/2018 | Shubert et al. |
| 2018/0066400 A1 | 3/2018 | Waldron et al. |
| 2018/0080226 A1 | 3/2018 | Lu et al. |
| 2018/0305257 A1 | 10/2018 | Lu et al. |
| 2019/0023612 A1 | 1/2019 | Sang et al. |
| 2019/0023614 A1* | 1/2019 | Sang ............... C04B 28/145 |
| 2019/0270675 A1 | 9/2019 | Harrison et al. |
| 2019/0337266 A1 | 11/2019 | Yu et al. |
| 2019/0338516 A1 | 11/2019 | Ray et al. |
| 2020/0055277 A1 | 2/2020 | Hemphill et al. |
| 2020/0055278 A1 | 2/2020 | Li et al. |
| 2020/0262180 A1 | 8/2020 | Hemphill et al. |
| 2021/0155545 A1 | 5/2021 | Li et al. |
| 2021/0198148 A1 | 7/2021 | Li et al. |

FOREIGN PATENT DOCUMENTS

| | | | |
|---|---|---|---|
| AU | 2014203388 B2 | 9/2016 | |
| CA | 998929 A | 10/1976 | |
| CN | 105016691 A | 11/2015 | |
| CN | 105587084 A | 5/2016 | |
| CN | 109133824 A | 1/2019 | |
| DE | 4127929 A1 | 2/1993 | |
| EP | 1112986 A1 | 7/2001 | |
| EP | 1114005 A1 | 7/2001 | |
| EP | 1637302 B1 | 5/2004 | |
| EP | 1114005 B1 | 11/2005 | |
| EP | 2929996 B1 | 4/2019 | |
| EP | 3342571 A1 | 7/2020 | |
| GB | 191370 A | 8/1923 | |
| GB | 490667 A | 8/1938 | |
| GB | 516484 A | 1/1940 | |
| GB | 869217 A | 5/1961 | |
| GB | 879392 A | 10/1961 | |
| GB | 881835 A | 11/1961 | |
| GB | 1381457 A | 1/1975 | |
| GB | 1573871 A | 8/1980 | |
| JP | S50-015810 A | 2/1975 | |
| JP | H06-042145 A | 2/1994 | |
| JP | 2005-146651 A | 6/2005 | |
| RU | 2280560 C2 | 7/2006 | |
| WO | WO 1999/057371 A1 | 11/1999 | |
| WO | WO 2000/006518 A1 | 2/2000 | |
| WO | WO 2008/049473 A2 | 5/2008 | |
| WO | WO 2009/142791 A2 | 11/2009 | |
| WO | WO 2011/052048 A1 | 5/2011 | |
| WO | WO-2017101110 A1 * | 6/2017 | ............ B32B 13/08 |
| WO | WO-2018158253 A1 * | 9/2018 | ............ C04B 28/14 |
| WO | WO 2019/040710 A1 | 2/2019 | |
| WO | WO 2020/036839 A1 | 2/2020 | |
| WO | WO 2020/036842 A1 | 2/2020 | |

OTHER PUBLICATIONS

U.S. Appl. No. 62/939,264, Hemphill et al., filed Nov. 22, 2019.
Bomberg et al., "Weather Resistive Barriers: Laboratory Testing of Moisture Flow," (2003).
Burrows, "A Decade's Experience of Gypsum Board Weight Reduction in the U.S.", 14. Internationale Baustofftagung 1.0197-1.0207 (Weimar, Sep. 20-23, 2000).
Pflughoeft-Hassett et al., "A Comparison of Properties of FGD & Natural Gypsum Products, Agricultural & Industrial Uses of FGD Gypsum Workshop," EERC, Oct. 23, 2007, Atlanta, Georgia.
Machine Translation of JP 2005-146651 (Year: 2005).
Office Action dated Dec. 10, 2020 from U.S. Appl. No. 16/401,719 to United States Gypsum Company.
Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).
European Patent Office, International Search Report and the Written Opinion in International Application No. PCT/US2020/058100 (dated Feb. 10, 2021).
European Patent Office, International Search Report and the Written Opinion in International Application No. PCT/US2020/058092 (dated Feb. 22, 2021).
European Patent Office, International Search Report and the Written Opinion in International Application No. PCT/US2020/058095 (dated Feb. 17, 2021).
U.S. Appl. No. 16/401,675, filed May 2, 2019.
U.S. Appl. No. 16/401,719, filed May 2, 2019.
U.S. Appl. No. 16/904,756, filed Jun. 18, 2020.
U.S. Appl. No. 16/904,779, filed Jun. 18, 2020.

* cited by examiner

METHOD OF PREPARING GYPSUM WALLBOARD FROM HIGH SALT GYPSUM, AND RELATED PRODUCT

CROSS-REFERENCE TO RELATED APPLICATION

This patent application claims the benefit of priority to U.S. Provisional Patent Application No. 62/930,965, filed on Nov. 5, 2019, and entitled, "Method of Preparing Gypsum Wallboard from High Salt Gypsum, and Related Product," which is incorporated by reference in its entirety herein.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum (calcium sulfate dihydrate) is a well-known material that is used in such products. Panels containing set gypsum are often referred to as gypsum boards, which contain a board core (set gypsum core) sandwiched between two cover sheets, particularly paper cover sheets. Such panels are commonly used in drywall construction of the interior walls and ceilings of buildings. One or more denser regions, often referred to as "skim coats," may be included as layers on either face of the board core, usually at an interface between the board core and an inner surface of a cover sheet or a coating thereon. The denser regions may be contiguous with a less dense region of the gypsum layer which provides the gypsum core layer of the gypsum board.

During manufacture of a gypsum board, the stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a skim coat. If present, the skim coat is applied upstream from the location where the gypsum slurry is discharged onto the first cover sheet. After applying the gypsum slurry to the first cover sheet, a second cover sheet, again optionally bearing a skim coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards having a desired length.

Gypsum (calcium sulfate dihydrate and any impurities) suitable for use in wallboard may be obtained from both natural sources and synthetic sources, followed by further processing.

Natural gypsum may be used by calcining its calcium sulfate dihydrate to produce the hemihydrate form. Gypsum from natural sources is a naturally occurring mineral and can be mined in rock form. Naturally occurring Gypsum is a mineral that is typically found in old salt-lake beds, volcanic deposits, and clay beds. When it is mined, raw gypsum is generally found in the dihydrate form Gypsum is also known as calcium sulfate dihydrate, terra alba or landplaster. This material is also produced as a by-product in various industrial processes. For example, synthetic gypsum is a byproduct of flue gas desulfurization processes from power plants. In gypsum, there are approximately two molecules of water associated with each molecule of calcium sulfate.

Plaster of Paris is also known as calcined gypsum, stucco, calcium sulfate semihydrate, calcium sulfate half-hydrate or calcium sulfate hemihydrate.

When calcium sulfate dihydrate from either source is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Gypsum may also be obtained synthetically (referred to as "syngyp" in the art) as a by-product of industrial processes such as flue gas desulfurization from power plants, for example. Natural or synthetic gypsum can be calcined at high temperatures, typically above 150° C., to form stucco (i.e., calcined gypsum in the form of calcium sulfate hemihydrate and/or calcium sulfate anhydrite), which may undergo subsequent rehydration to form set gypsum in a desired shape, such as a board.

Synthetic gypsum obtained from power plants is usually suitable for use in gypsum panels intended for construction projects. Synthetic gypsum is a byproduct of flue gas desulfurization processes from power plants (also known as desulphurisation gypsum or desulphogyspum or DSG). In particular, flue gas including sulfur dioxide is wet scrubbed with lime or limestone, which produces calcium sulfite in the following reaction.

$$CaCO_3 + SO_2 \rightarrow CaSO_3 + CO_2$$

The calcium sulfite is then converted to calcium sulfate in the following reaction.

$$CaSO_3 + 2H_2O + \tfrac{1}{2}O_2 \rightarrow CaSO_4 \cdot 2H_2O$$

The hemihydrate form may then be produced by calcination in a similar manner to that used for natural gypsum.

However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The extraneous salts can be problematic due to their tendency to decrease adhesion between the board core and the cover sheets, particularly a back paper cover sheet.

It will be appreciated that this background description has been created by the inventors to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The invention relates to gypsum board and a method of gypsum board where the board exhibits good adhesion between a gypsum layer and a cover sheet of the board. The invention has particular applicability with boards formed from stucco containing a high content of salt impurities. Generally, stucco is formed by calcining gypsum from natural or synthetic sources. In nature, it is a common abundant mineral that can be mined from the earth. The synthetic form of gypsum can be derived as a byproduct from flue gas desulfurization (FGD) processes associated with coal-fired electric powerplants that burn high sulfur coals. In the powerplants, sulfur dioxide emissions are removed through a wet scrubbing process. A limestone slurry injection results in precipitation of synthetic gypsum following fly ash removal. For example, some forms of synthetic gypsum contain the high content of salt impurities, which then remain in the stucco formed as calcined gypsum. The salt impurities in the synthetic gypsum can result from, for example high salt coals. These salt impurities have been found to deleteriously affect bonding between a cover sheet (e.g., formed from paper) and a gypsum layer (e.g., the board core) in the board.

The gypsum board is formed to include gypsum layers disposed between two cover sheets. The gypsum layers generally include a core layer, as well as a skim coat layer between a first major surface of the core and a cover sheet. In some embodiments, there is a second skim coat layer between a second major surface of the core and a second cover sheet opposite to the first cover sheet, which arrangement is understood in the art. At least one skim coat is very thin relative to the core and contains starch to enhance bonding between the cover sheet and the board core. In preferred embodiments, the starch is a native starch and is included in the skim coat layer between the board core and the back paper cover sheet. In this manner, the invention allows for improved adhesion even when the board core and/or other gypsum layers are formed from stucco derived from low quality synthetic gypsum, e.g., containing undesirable extraneous salts, including chloride salts such as NaCl, KCl, $MgCl_2$, and/or $CaCl_2$, which previously were found to interfere with paper-core bonding.

Thus in one aspect, the invention provides a composite gypsum board. The gypsum board comprises a board core. The board core comprises set gypsum formed from a first slurry. The first slurry comprises water and stucco containing a high salt impurity content. The first slurry can contain other ingredients as desired, such as foaming agents, core starch, dispersants, accelerators, retarders, polyphosphates, etc. The core defines first and second core faces opposite of each other. The board comprises a first (face) skim coat layer defining first and second skim coat faces. The first skim coat layer is formed from a second slurry comprising water, the stucco, and, skim coat starch. The first skim coat layer is disposed in bonding relation to the first core face. The board also comprises a first (face, sometimes called Manila) cover sheet. The first face of the first skim coat layer faces the first cover sheet, and the second face of the skim coat layer faces the board core. The board further comprises a second (back, sometimes called Newsline) cover sheet. The second face of the board core faces the second cover sheet. The board further comprises a second skim coat layer defining first and second faces. The second skim coat layer is formed from a third slurry comprising water, the stucco, and the starch. The starch is preferably a native starch and enhances the bond between the board core and the first cover sheet. The first face of the second skim coat layer faces the second face of the board core, and the second face of the second skim coat layer faces the second cover sheet. The second and third slurries can be the same or different.

In another aspect, the invention provides a method of making composite gypsum board. The method comprises mixing at least water and stucco containing a high salt impurity content to form a core slurry. The core slurry can contain other ingredients as desired, such as foaming agents, core starch, dispersants, accelerators, retarders, polyphosphates, etc. The method also comprises mixing at least water, stucco, and, optionally a skim coat starch to form a face skim coat slurry. The face skim coat slurry is disposed in a bonding relation to a face cover sheet to form a face composite having a slurry surface and a cover sheet surface. The core slurry is disposed in a bonding relation to the face composite to form a core composite. The core slurry forms a board core having first and second faces, the first face facing the slurry surface of the face composite. Water, stucco, and skim coat starch are mixed to form a back skim coat slurry. The face and back skim coat slurries can be the same or different. The back skim slurry is disposed in bonding relation to a back cover sheet to form a back composite having a slurry surface and a cover sheet surface. The back composite is disposed in a bonding relation to the core composite to form a board precursor. The slurry surface of the back composite faces the second face of the core. The board precursor is dried to form a board. The skim coat starch enhances the bond between the board core and the back cover sheet, and optionally between the board core and the first cover sheet In another aspect, the invention provides a method for enhancing adhesion between a gypsum layer and a back cover sheet in a gypsum board formed from an aqueous slurry containing calcium sulfate hemihydrate (stucco) and high content of salt impurities, as well as other ingredients as desired, such as core starch and other ingredients as discussed herein. In some embodiments, the salt impurities are in the form of chloride salts, such as NaCl, KCl, $MgCl_2$, and/or $CaCl_2$). For example, the aqueous slurry can include at least about 150 ppm chloride anion per 1,000,000 parts by weight of calcium sulfate hemihydrate. The method comprises mixing at least water, core starch and stucco containing a high salt impurity content to form a first slurry. A second slurry is formed from at least water, the stucco, and optionally a skim coat starch and it is mixed. The second slurry is applied in a bonding relation to a first (face) cover sheet to form a skim coat layer. The skim coat layer has a first face and a second face. The first face of the skim coat layer faces the first cover sheet. The first slurry is applied in a bonding relation to the skim coat layer to form a board core having a first face and a second face. The first face of the board core faces the second face of the skim coat layer. A second (back) cover sheet is applied in bonding relation to the second face of the board core face to form a board precursor. A third slurry comprising water, the stucco, and the skim coat starch is applied onto a first surface of the second cover sheet to form a second skim coat layer that is disposed between the second cover sheet and the board core. The skim coat starch enhances the bond between the board core and the second (back) cover sheet. The second and third slurries can be the same or different. The board precursor is dried to form a board.

BRIEF DESCRIPTION OF THE SEVERAL VIEWS OF THE DRAWING(S)

DETAILED DESCRIPTION OF THE INVENTION

Figure 1A:
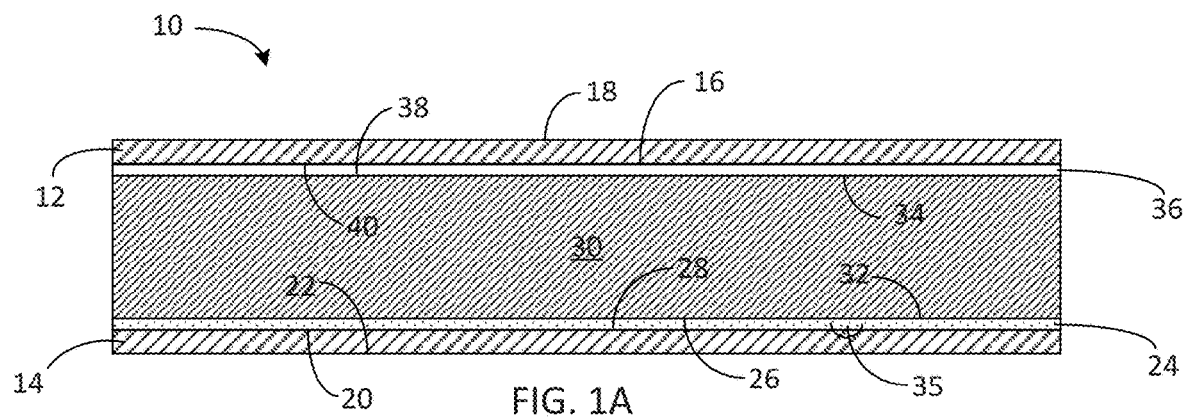
FIG. 1A is a schematic illustration (not drawn to scale) of a cross-section of a wallboard with skim coats in accordance with embodiments of the invention.

The invention is predicated, at least in part, on enhancing adhesion between a gypsum layer and a cover sheet (e.g., composed of paper). The invention is particularly useful for gypsum boards containing one or more gypsum layers formed from a stucco slurry containing appreciable quantities of extraneous salts. For example, in some embodiments, the salts are chloride salts, e.g., sodium chloride (NaCl), potassium chloride (KCl), magnesium chloride ($MgCl_2$), and/or calcium chloride ($CaCl_2$)).

Such salts can be found, for example, in stucco slurries where the stucco is derived from a low quality synthetic gypsum. In this regard, normally, a board manufacturing facility is sourced with gypsum that is then calcined to form stucco. The stucco is then reacted with water to form the gypsum (i.e., calcium sulfate dihydrate) layer of desired dimensions. If the low quality synthetic gypsum contains the appreciable quantities of salt impurities, such salts have been found to remain with the stucco after calcining and hence are present in the stucco slurry. In some embodiments, the stucco slurry comprises high qualities of the salts, e.g., at least about 150 ppm chloride anion per 1,000,000 parts by weight of said calcium sulfate hemihydrate, such as about 150 ppm to about 2000 ppm chloride anion per 1,000,000 parts by weight of said calcium sulfate hemihydrate. The presence of the salt impurities in appreciable amounts has been found to interfere with adhesion between the board core and the paper cover sheet.

In preferred embodiments, the skim coat layers generally have higher density and are very thin relative to the board core. The layer forming the board core is the primary gypsum layer since it is the largest contributor to thickness of the gypsum layers cumulatively, and to the board as a whole. The set gypsum core makes up a substantial thickness (e.g., at least about 90%, at least about 92%, at least about 95%, or at least about 97%) of the total thickness of all the gypsum layers. In some embodiments the first and/or second skim coat layer has a dry thickness of from about 0.125 inches (⅛ inch) to about 0.016 inches (1/64 inch). In preferred embodiments, at least one skim coat layer (preferably the skim coat layer adjacent to the back cover sheet) has a thickness of from about 0.08 inches to about 0.02 inches, such as from about 0.08 inches to about 0.03 inches, from about 0.07 inches to about 0.02 inches, from about 0.07 inches to about 0.03 inches, from about 0.06 inches to about 0.02 inches, from about 0.06 inches to about 0.03 inches, from about 0.05 inches to about 0.02 inches, from about 0.05 inches to about 0.03 inches, from about 0.04 inches to about 0.02 inches, or from about 0.04 inches to about 0.03 inches. Surprisingly and unexpectedly, including skim coat starch in the very thin back skim coat has been found to provide enhanced bonding between the core and the back cover sheet. While not wishing to be found by any particular theory, the presence of the skim coat starch in the thin skim coat is effective for enhancing cover sheet-gypsum core bonding because it is believed the starch acts as glue to bind the paper fibers and gypsum crystals in the core tightly.

The composite gypsum board comprises a board core comprised of set gypsum formed from a first slurry. The first slurry comprises water and stucco containing a high salt impurity content. The first slurry can contain other ingredients as desired, such as foaming agents, core starch, dispersants, accelerators, retarders, polyphosphates, etc. The core defines opposing first and second core faces. The composite gypsum board comprises a skim coat layer defining first and second skim coat faces. The skim coat is formed from a second slurry comprising water, the stucco, and a skim coat starch. The skim coat is disposed in bonding relation to the first core face. The composite gypsum board comprises a first cover sheet. The first face of the skim coat layer faces the first cover sheet, and the second face of the skim coat layer faces the board core. The starch enhances the bond between the board core and the first cover sheet. In some embodiments, the board further comprises a second cover sheet. The second face of the board core faces the second cover sheet. In preferred embodiments, the skim coat starch is present in the back cover sheet. While not wishing to be bound by any particular theory, it is believed that the back paper has been especially susceptible to poor adhesion to the board core in the presence of the salt impurities because the salt impurities have tended to migrate toward the back paper during the drying process.

Figure 1B:
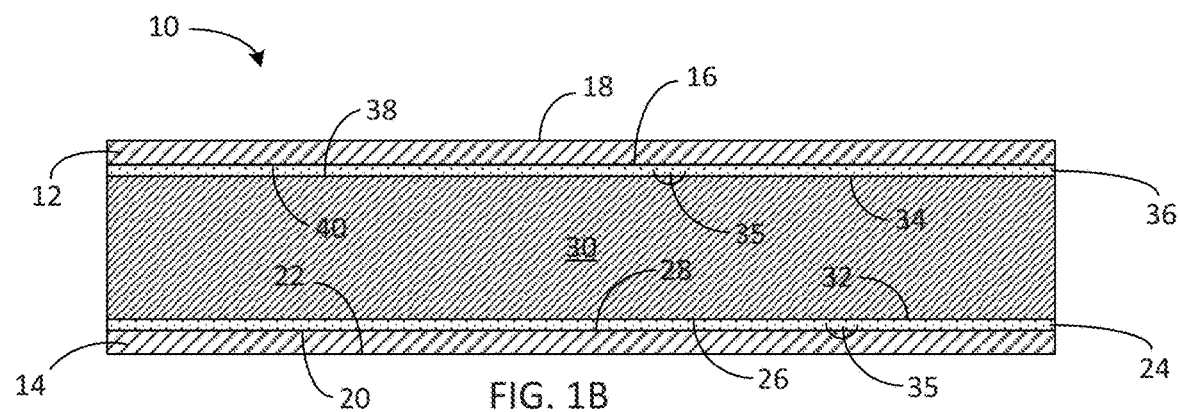
FIG. 1B is a schematic illustration (not drawn to scale) of a cross-section of a wallboard with a skim coat in accordance with embodiments of the invention.

To illustrate, FIGS. 1A-1B schematically depict embodiments of the invention where a composite gypsum board 10 is shown. The board 10 comprises a face cover sheet 12 and a back cover sheet 14. The face cover sheet 12 has a first face 16 and a second face 18, which is generally the surface visible when the board 10 is installed. The back cover sheet 14 has a first face 20 and a second face 22 that is generally the outer surface of the board 10 that is inwardly facing studs, joists or the like when installed.

A back skim coat layer 24 has a first face 26 and a second face 28 that faces the first face 20 of the back cover sheet 14. A board core 30 is disposed between the two cover sheets 12 and 14. In general, skim coat layers are gypsum layers that are relatively denser and thinner than the board core 30. The board core 30 has a first face 32 and a second face 34. The first face 32 of the board core 30 faces the first face 20 of the back cover sheet 14. The back skim coat layer 24 includes skim coat starch 35 (depicted as dots in FIGS. 1A-1B) for enhancing adhesion of the core 30 to the cover sheet 14. As shown in FIGS. 1A-1B, a face skim coat layer 36 is preferably provided between the face cover sheet 12 and board core 30.

If included, the face skim coat layer 36 has a first surface 38 facing the board core 30, and a second surface 40 facing the face cover sheet 12, as seen in FIGS. 1A-1B. When the face skim coat layer 36 is present, in some embodiments it is formed from the same slurry used to form the board core, e.g., such that it contains core starch and not skim coat starch, as shown in FIG. 1A. Alternatively, the face skim coat layer 36 is formed from a slurry containing skim coat starch 35 in some embodiments, as seen in FIG. 1B.

In a wall assembly, the board can be affixed to a substrate, typically studs in a framing construction. In the wall assembly, the back surface of the board (i.e., the outer surface of the back cover sheet) faces inward toward the studs while the face surface of the board (i.e., the outer surface of the face cover sheet) is visible when the board is hanging when installed in use.

The invention also provides a method of making composite gypsum board. The method comprises mixing at least water and stucco containing a high salt impurity content to form a first slurry. The first slurry can contain other ingredients as desired, such as foaming agents, core starch, dispersants, accelerators, retarders, polyphosphates, etc. The method comprises mixing at least water, the stucco, and skim coat starch to form a second slurry. The method comprises applying the second slurry in a bonding relation to a first cover sheet to form a skim coat layer. The skim coat layer has a first face and a second face, wherein the first face of the skim coat layer faces the first cover sheet. The method comprises applying the first slurry in a bonding relation to the skim coat layer to form a board core having a first face and a second face. The first face of the board core faces the second face of the skim coat layer. A third slurry is prepared. The method comprises applying the second cover sheet in bonding relation to the second face of the board core face to form a board precursor. The third slurry comprises water, the stucco, and the skim coat starch and it is applied, e.g., onto a first surface of a second cover sheet to form a second skim coat layer that is disposed between the second cover sheet and the board core. The starch in the third slurry enhances the bond between the board core and the second cover sheet. The second and third slurries can be the same or different. The second and third slurries can have the core starch except the skim coat starch. The skim coat starch enhances the bond between the board core and the first cover sheet. The method comprises drying the board precursor to form a board.

A primary slurry used for forming the gypsum board core can contain core starch while the back skim coat layer and optionally the face skim coat layer are formed from slurry that contains skim coat starch. In some embodiments, the skim coat starch is provided in a higher relative concentration in the slurry for forming the skim coat layer as compared with the amount of core starch in the slurry for forming the board core. As discussed herein, the skim coat starch surprisingly and unexpectedly enhances the adhesion of its corresponding (adjacent) cover sheet even in the presence of unwanted salt impurities. In some embodiments, the core starch is not believed to be effective in aiding adhesion of the cover sheet when salt impurities are present.

The core starch is provided for strength enhancement as discussed in, e.g., U.S. Pat. Nos. 9,540,810, 9,828,441, and 10,399,899, and U.S. application Ser. No. 15/934,088. In some embodiments, a migrating starch as known in the art can be additionally included in the core slurry. Migrating starches normally have smaller chain lengths (e.g., due to acid- or enzyme-modification) and migrate to the core-cover sheet interface for further bond enhancement without appreciable effect on the core strength.

In preferred embodiments, the core starch is in the form of a pregelatinized starch, e.g., having a viscosity of from about 20 centipoise to about 700 (such as from about 20 centipoise to about 300 centipoise or from about 30 centipoise to about 200 centipoise) when the viscosity is measured while the starch is subjected to conditions according to the VMA method. In some embodiments, the core starch is a native starch. In some embodiments, the core starch includes an uncooked starch having (i) a hot water viscosity of from about 20 BU to about 300 BU according to the hot water viscosity assay (HWVA method), and/or (ii) a mid-range peak viscosity of from about 120 BU to 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. In some embodiments, the core starch includes a migrating starch having a molecular weight of about 6,000 Daltons or less.

Skim coat starch is included in at least one skim coat layer (and optionally in both skim coat layers in some embodiments). The starch used in making the skim coat layer is effective to enhance bonding between the core and the cover sheet to which it is adjacent, as compared with boards made without the starch in the slurry for forming the skim coat layer(s). In preferred embodiments, the starch is a native starch. In some embodiments, the skim coat starch includes an uncooked starch having (i) a hot water viscosity of from about 20 BU to about 300 BU according to the hot water viscosity assay (HWVA method), and/or (ii) a mid-range peak viscosity of from about 120 BU to 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. Alternatively, if desired, the skim coat starch can be in the form of a pregelatinized starch, e.g., having a viscosity of from about 20 centipoise to about 700 (such as from about 20 centipoise to about 300 centipoise or from about 30 centipoise to about 200 centipoise) when the viscosity is measured while the starch is subjected to conditions according to the VMA method. In some embodiments, the skim coat starch includes a migrating starch having a molecular weight of about 6,000 Daltons or less. The HWVA method is set forth in, e.g., U.S. Patent Publication 2019/0023612 A1, while the VMA method is set forth in, e.g., U.S. Patent Publication 2012/0113124, which methodologies are hereby incorporated by reference.

In some embodiments, the skim coat starch is present in at least one of the skim coat layers, preferably at least the skim coat layer adjacent to the back paper, in an amount of from about 0.3% to about 8.0% by weight of the stucco, e.g., from about 1.0% to about 4.0% by weight of the stucco, in the second and/or third slurries. In some embodiments, the skim coat starch is included in the second skim coat layer adjacent the back cover sheet, but the slurry for making the first skim coat layer adjacent the face cover sheet is formed from the same slurry for making the core, e.g., such that it contains core starch. The total skim coat starch usage in the second and/or third slurry is higher than the core starch usage in the first slurry. In preferred embodiments, usage of core starch is from about 0.1 to about 1.5 wt % by weight of stucco, while the usage of skim coat starch is from about 1.5 to about 4.0 wt % by weight of the stucco. In some embodiments, the core starch is a pregelatinized starch and the skim coat starch is an uncooked starch, with a migrating starch additionally being optional in the core starch and/or the skim coat starch.

The face and back cover sheets can have any suitable basis weight and thickness. Generally, the thickness of the face and back cover sheet (e.g., composed of paper) is determined by the (e.g., paper) weight. For example, in some embodiments, the face and back cover sheets can have a basis weight of from about 10 lb/msf to about 55 lb/msf, e.g., from about 20 lb/msf to about 55 lb/msf, from about 20 lb/msf to about 50 lb/msf, from about 20 lb/msf to about 40 lb/msf, from about 30 lb/msf to about 55 lb/msf, from about 30 lb/msf to about 50 lb/msf, from about 30 lb/msf to about 40 lb/msf, etc. In some embodiments, one or both of the face and back cover sheets have a weight of from about 15 lb/MSF to about 35 lb/msf, such as from about 20 lb/MSF to about 33 lb/msf, from about 20 lb/MSF to about 31 lb/msf, from about 20 lb/MSF to about 29 lb/msf, from about 20 lb/MSF to about 27 lb/msf, from about 15 lb/MSF to about 31 lb/msf, etc. Paper at such weights can have a nominal thickness of about 0.005 inch to about 0.015 inch thick, e.g., 0.007 to about 0.03 inch (e.g., about 0.01 inch). In some embodiments, one or more of the cover sheets can be in the form of paper having a thickness of from about 0.008 inch to about 0.013 inch. Optionally, in some embodiments, the board can include an intermediate sheet as described in U.S. patent application Ser. No. 16/581,070.

The gypsum layers (board core and skim coat layer(s)) are formed from a slurry comprising at least water and stucco. As referred to herein throughout, stucco can be in the form of calcium sulfate alpha hemihydrate, calcium sulfate beta hemihydrate, and/or calcium sulfate anhydrite. In addition to the stucco and water, the board core is formed from an agent that contributes to its lower density, such as a low density filler (e.g., perlite, low density aggregate or the like), or foaming agents. Various foaming agent regimes are well known in the art. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, PA Other commercially available soaps include the Polystep B25, from Stepan Company, Northfield, Illinois. The foaming agents described herein can be used alone or in combination with other foaming agents. The foam can be pregenerated and then added to the stucco slurry. The pregeneration can occur by inserting air into the aqueous foaming agent. Methods and apparatus for generating foam are well known. See, e.g., U.S. Pat. Nos. 4,518,652; 2,080,009; and 2,017,022.

In some embodiments, the foaming agent comprises, consists of, or consists essentially of at least one alkyl sulfate, at least one alkyl ether sulfate, or any combination thereof but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.0005 wt. %, below about 0.001 wt. %, below about 0.00001 wt. %, etc., based on the weight of stucco, as one of ordinary skill in the art will appreciate.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_5$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap, e.g., with an alkoxylated alkyl sulfate soap with an alkyl chain length of 8-12 carbon atoms and an alkoxy (e.g., ethoxy) group chain length of 1-4 units. The second foaming agent is optionally an unalkoxylated (e.g., unethoxylated) alkyl sulfate soap with an alkyl chain length of 6-20 carbon atoms, e.g., 6-18 or 6-16 carbon atoms. Regulating the respective amounts of these two soaps, in accordance with some embodiments, is believed to allow for control of the board foam structure until about 100% stable soap or about 100% unstable soap is reached.

In some embodiments, a fatty alcohol optionally can be included with the foaming agent, e.g., in a pre-mix to prepare the foam, as described in U.S. Patent Publications US 2017/0096369 A1, US 2017/0096366 A1, and US 2017/0152177 A1. This can result in an improvement in the stability of the foam, thereby allowing better control of foam (air) void size and distribution. The fatty alcohol can be any suitable aliphatic fatty alcohol. It will be understood that, as defined herein throughout, "aliphatic" refers to alkyl, alkenyl, or alkynyl, and can be substituted or unsubstituted, branched or unbranched, and saturated or unsaturated, and in relation to some embodiments, is denoted by the carbon chains set forth herein, e.g., $C_x$-$C_y$, where x and y are integers. The term aliphatic thus also refers to chains with heteroatom substitution that preserves the hydrophobicity of the group. The fatty alcohol can be a single compound, or can be a combination of two or more compounds. In some embodiments, the optional fatty alcohol is a $C_6$-$C_{20}$ fatty alcohol (e.g., $C_6$-$C_{18}$, $C_6$-$C_{116}$, $C_6$-$C_{14}$, $C_6$-$C_{12}$, $C_6$-$C_{10}$, $C_6$-$C_8$, $C_8$-$C_{16}$, $C_8$-$C_{14}$, $C_8$-$C_{12}$, $C_8$-$C_{10}$, $C_{10}$-$C_{16}$, $C_{10}$-$C_{12}$, $C_{12}$-$C_{16}$, $C_{12}$-$C_{14}$, or $C_{14}$-$C_{16}$ aliphatic fatty alcohol, etc.). Examples include octanol, nonanol, decanol, undecanol, dodecanol, or any combination thereof.

In some embodiments, the optional foam stabilizing agent comprises the fatty alcohol and is essentially free of fatty acid alkyloamides or carboxylic acid taurides. In some embodiments, the optional foam stabilizing agent is essentially free of a glycol, although glycols can be included in some embodiments, e.g., to allow for higher surfactant content. Essentially free of any of the aforementioned ingredients means that the foam stabilizer contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.0001 wt. %, such as below about 0.00005 wt. %, below about 0.00001 wt. %, below about 0.000001 wt. %, etc., based on the weight of stucco, as one of ordinary skill in the art will appreciate.

It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 μm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, from about 0.7:1 to about 9:1, from about 0.8:1 to about 9:1, from about 1.4:1 to about 9:1, from about 1.8:1 to about 9:1, from about 2.3:1 to about 9:1, from about 0.7:1 to about 6:1, from about 1.4:1 to about 6:1, from about 1.8:1 to about 6:1, from about 0.7:1 to about 4:1, from about 1.4:1 to about 4:1, from about 1.8:1 to about 4:1, from about 0.5:1 to about 2.3:1, from about 0.7:1 to about 2.3:1, from about 0.8:1 to about 2.3:1, from about 1.4:1 to about 2.3:1, from about 1.8:1 to about 2.3:1, etc.

As used herein, a void size is calculated from the largest diameter of an individual void in the core. The largest diameter is the same as the Feret diameter. The largest diameter of each defined void can be obtained from an image of a sample. Images can be taken using any suitable technique, such as scanning electron microscopy (SEM), which provides two-dimensional images. A large number of pore sizes of voids can be measured in an SEM image, such that the randomness of the cross sections (pores) of the voids can provide the average diameter. Taking measurements of voids in multiple images randomly situated throughout the core of a sample can improve this calculation. Additionally, building a three-dimensional stereological model of the core based on several two-dimensional SEM images can also improve the calculation of the void sizes. Another technique is X-ray CT-scanning analysis (XMT), which provides a three-dimensional image. Another technique is optical microscopy, where light contrasting can be used to assist in determining, e.g., the depth of voids. The voids can be measured either manually or by using image analysis software, e.g., ImageJ, developed by NIH. One of ordinary skill in the art will appreciate that manual determination of void sizes and distribution from the images can be determined by visual observation of dimensions of each void. The sample can be obtained by sectioning a gypsum board.

The foaming agent can be included in the core slurry in any suitable amount, e.g., depending on the desired density. A solution of foaming agent is prepared at, for example, about 0.5% (w/w). Proper amount of air is mixed with the proper amount of the solution of foaming agent, and added into slurry. Depending on the amount of air required, the concentration of the solution of the foaming agent can vary from about 0.1% to about 1% (w/w). Since the skim coat layers have a higher density, the slurry for forming the skim coat layers can be made with less (or no) foam.

The fatty alcohol can be present, if included, in the core slurry in any suitable amount. In some embodiments, the fatty alcohol is present in the core slurry in an amount of from about 0.0001% to about 0.03% by weight of the stucco, e.g., from about 0.0001% to about 0.025% by weight of the stucco, from about 0.0001% to about 0.02% by weight of the stucco, or from about 0.0001% to about 0.01% by weight of the stucco. Since the slurries for the skim coat layers can have less or no foam, the fatty alcohol is not required in the skim coat layers, or else can be included in a lower amount, such as from about 0.0001% to about 0.004% by weight of the stucco, e.g., from about 0.00001% to about 0.003% by weight of the stucco, from about 0.00001% to about 0.0015% by weight of the stucco, or from about 0.00001% to about 0.001% by weight of the stucco.

Other ingredients as known in the art can also be included in the board core slurry, including, for example, accelerators, retarders, etc. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

In addition, the board core can be further formed from at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. For naphthalenesulfonate dispersants, in some embodiments, they are selected to have molecular weights from about 3,000 to about 10,000 (e.g., about 8,000 to about 10,000). In some embodiments, higher water demand naphthalenesulfonates can be used, e.g., having molecular weights above 10,000. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals, Ambler, PA.

If included, the dispersant can be provided in any suitable amount. In some embodiments, for example, the dispersant can be present in the board core slurry in an amount, for example, from about 0% to about 0.5%, e.g., from about 0.01% to about 0.7%, e.g., from about 0.01% to about 0.4% by weight of the stucco, from about 0.1% to about 0.2%, etc.

In some embodiments, the board core can be further formed from at least one phosphate-containing compound, if desired, to enhance green strength, dimensional stability, and/or sag resistance. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Green strength refers to the strength of the board while still wet during manufacture. Due to the rigors of the manufacturing process, without sufficient green strength, a board precursor can become damaged on a manufacturing line.

Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$ wherein n=1,000-3,000, or polyphosphoric acid having two or more repeating phosphoric acid units and having the molecular formula $H_{n+2}P_nO_{3n+1}$ wherein n is two or more.

If included, the polyphosphate can be present in any suitable amount. To illustrate, in some embodiments, the polyphosphate can be present in the slurry in an amount, for example, from about 0.1% to about 1%, e.g., about 0.2% to about 0.4% by weight of the stucco, from about 0% to about 0.5%, e.g., from about 0% to about 0.2% by weight of the stucco. Thus, the dispersant and polyphosphate optionally can be in any suitable amount in the core slurry.

The board core can have any suitable density useful in contributing to a desired total composite board density, such as, for example, a core density of from about 16 pcf (about 260 kg/m³) to about 40 pcf, e.g., from about 18 pcf to about 40 pcf, 18 pcf to about 38 pcf, 18 pcf to about 36 pcf, 18 pcf to about 32 pcf, 20 pcf to about 40 pcf, 20 pcf to about 36 pcf, 20 pcf to about 32 pcf, 22 pcf to about 40 pcf, 22 pcf to about 36 pcf, 22 pcf to about 32 pcf, 26 pcf to about 40 pcf, 26 pcf to about 36 pcf, or 26 pcf to about 32 pcf. In some embodiments, the board core has an even lower density, e.g., about 30 pcf or less, about 29 pcf (about 460 kg/m³) or less, about 28 pcf or less, about 27 pcf (about 430 kg/m³) or less, about 26 pcf or less, etc. For example, in some embodiments, the core density is from about 12 pcf (about 190 kg/m³) to about 30 pcf, from about 14 pcf (about 220 kg/m³) to about 30 pcf, 16 pcf to about 30 pcf, 16 pcf to about 28 pcf, 16 pcf to about 26 pcf, 16 pcf to about 22 pcf (about 350 kg/m³), 18 pcf to about 30 pcf, 18 pcf to about 28 pcf, 18 pcf to about 26 pcf, 18 pcf to about 24 pcf, 20 pcf to about 30 pcf, 20 pcf to about 28 pcf, 20 pcf to about 26 pcf, 20 pcf to about 24 pcf, 22 pcf to about 28 pcf, etc.

In some embodiments, composite board made according to the disclosure meets test protocols according to ASTM Standard C473-07. For example, in some embodiments, when the board is cast at a thickness of ½ inch, the dry board has a nail pull resistance of at least about 67 $lb_f$ (pounds force) as determined according to ASTM C473-07 (method B), e.g., at least about 68 $lb_f$, at least about 70 $lb_f$, at least about 72 $lb_f$, at least about 74 $lb_f$, at least about 75 $lb_f$, at least about 76 $lb_f$, at least about 77 $lb_f$, etc. In various embodiments, the nail pull resistance can be from about 67 $lb_f$ to about 100 $lb_f$, from about 67 $lb_f$ to about 95 $lb_f$, from about 67 $lb_f$ to about 90 $lb_f$, from about 67 $lb_f$ to about 85 $lb_f$, from about 67 $lb_f$ to about 80 $lb_f$, from about 67 $lb_f$ to about 75 $lb_f$, from about 68 $lb_f$ to about 100 $lb_f$, from about 68 $lb_f$ to about 95 $lb_f$, from about 68 $lb_f$ to about 90 $lb_f$, from about 68 $lb_f$ to about 85 $lb_f$, from about 68 $lb_f$ to about 80 $lb_f$, from about 70 $lb_f$ to about 100 $lb_f$, from about 70 $lb_f$ to about 95 $lb_f$, from about 70 $lb_f$ to about 90 $lb_f$, from about 70 $lb_f$ to about 85 $lb_f$, from about 70 $lb_f$ to about 80 $lb_f$, from about 72 $lb_f$ to about 100 $lb_f$, from about 72 $lb_f$ to about 95 $lb_f$, from about 72 $lb_f$ to about 90 $lb_f$, from about 72 $lb_f$ to about 85 $lb_f$, from about 72 $lb_f$ to about 80 $lb_f$, from about 72 $lb_f$ to about 77 $lb_f$, from about 72 $lb_f$ to about 75 $lb_f$, from about 75 $lb_f$ to about 100 $lb_f$, from about 75 $lb_f$ to about 95 $lb_f$, from about 75 $lb_f$ to about 90 $lb_f$, from about 75 $lb_f$ to about 85 $lb_f$, from about 75 $lb_f$ to about 80 $lb_f$, from about 75 $lb_f$ to about 77 $lb_f$, from about 77 $lb_f$ to about 100 $lb_f$, from about 77 $lb_f$ to about 95 $lb_f$, from about 77 $lb_f$ to about 90 $lb_f$, from about 77 $lb_f$ to about 85 $lb_f$, or from about 77 $lb_f$ to about 80 $lb_f$.

In some embodiments, the composite gypsum board can have an average core hardness of at least about 11 $lb_f$, e.g., at least about 12 $lb_f$, at least about 13 $lb_f$, at least about 14 $lb_f$, at least about 15 $lb_f$, at least about 16 $lb_f$, at least about 17 $lb_f$, at least about 18 $lb_f$, at least about 19 $lb_f$, at least about 20 $lb_f$, at least about 21 $lb_f$, or at least about 22 $lb_f$, as determined according to ASTM C473-07, method B. In some embodiments, board can have a core hardness of from about 11 $lb_f$ to about 25 $lb_f$, e.g., from about 11 $lb_f$ to about 22 $lb_f$, from about 11 $lb_f$ to about 21 $lb_f$, from about 11 $lb_f$ to about 20 $lb_f$, from about 11 $lb_f$ to about 19 $lb_f$, from about 11

$lb_f$ to about 18 $lb_f$, from about 11 $lb_f$ to about 17 $lb_f$, from about 11 $lb_f$ to about 16 $lb_f$, from about 11 $lb_f$ to about 15 $lb_f$, from about 11 $lb_f$ to about 14 $lb_f$, from about 11 $lb_f$ to about 13 $lb_f$, from about 11 $lb_f$ to about 12 $lb_f$, from about 12 $lb_f$ to about 25 $lb_f$, from about 12 $lb_f$ to about 22 $lb_f$, from about 12 $lb_f$ to about 21 $lb_f$, from about 12 $lb_f$ to about 20 $lb_f$, from about 12 $lb_f$ to about 19 $lb_f$, from about 12 $lb_f$ to about 18 $lb_f$, from about 12 $lb_f$ to about 17 $lb_f$, from about 12 $lb_f$ to about 16 $lb_f$, from about 12 $lb_f$ to about 15 $lb_f$, from about 12 $lb_f$ to about 14 $lb_f$, from about 12 $lb_f$ to about 13 $lb_f$, from about 13 $lb_f$ to about 25 $lb_f$, from about 13 $lb_f$ to about 22 $lb_f$, from about 13 $lb_f$ to about 21 $lb_f$, from about 13 $lb_f$ to about 20 $lb_f$, from about 13 $lb_f$ to about 19 $lb_f$, from about 13 $lb_f$ to about 18 $lb_f$, from about 13 $lb_f$ to about 17 $lb_f$, from about 13 $lb_f$ to about 16 $lb_f$, from about 13 $lb_f$ to about 15 $lb_f$, from about 13 $lb_f$ to about 14 $lb_f$, from about 14 $lb_f$ to about 25 $lb_f$, from about 14 $lb_f$ to about 22 $lb_f$, from about 14 $lb_f$ to about 21 $lb_f$, from about 14 $lb_f$ to about 20 $lb_f$, from about 14 $lb_f$ to about 19 $lb_f$, from about 14 $lb_f$ to about 18 $lb_f$, from about 14 $lb_f$ to about 17 $lb_f$, from about 14 $lb_f$ to about 16 $lb_f$, from about 14 $lb_f$ to about 15 $lb_f$, from about 15 $lb_f$ to about 25 $lb_f$, from about 15 $lb_f$ to about 22 $lb_f$, from about 15 $lb_f$ to about 21 $lb_f$, from about 15 $lb_f$ to about 20 $lb_f$, from about 15 $lb_f$ to about 19 $lb_f$, from about 15 $lb_f$ to about 18 $lb_f$, from about 15 $lb_f$ to about 17 $lb_f$, from about 15 $lb_f$ to about 16 $lb_f$, from about 16 $lb_f$ to about 25 $lb_f$, from about 16 $lb_f$ to about 22 $lb_f$, from about 16 $lb_f$ to about 21 $lb_f$, from about 16 $lb_f$ to about 20 $lb_f$, from about 16 $lb_f$ to about 19 $lb_f$, from about 16 $lb_f$ to about 18 $lb_f$, from about 16 $lb_f$ to about 17 $lb_f$, from about 17 $lb_f$ to about 25 $lb_f$, from about 17 $lb_f$ to about 22 $lb_f$, from about 17 $lb_f$ to about 21 $lb_f$, from about 17 $lb_f$ to about 20 $lb_f$, from about 17 $lb_f$ to about 19 $lb_f$, from about 17 $lb_f$ to about 18 $lb_f$, from about 18 $lb_f$ to about 25 $lb_f$, from about 18 $lb_f$ to about 22 $lb_f$, from about 18 $lb_f$ to about 21 $lb_f$, from about 18 $lb_f$ to about 20 $lb_f$, from about 18 $lb_f$ to about 19 $lb_f$, from about 19 $lb_f$ to about 25 $lb_f$, from about 19 $lb_f$ to about 22 $lb_f$, from about 19 $lb_f$ to about 21 $lb_f$, from about 19 $lb_f$ to about 20 $lb_f$, from about 21 $lb_f$ to about 25 $lb_f$, from about 21 $lb_f$ to about 22 $lb_f$, or from about 22 $lb_f$ to about 25 $lb_f$.

In some embodiments, one or both skim coat layers has an average dry core hardness that is at least about 1.5 times greater than the average dry core hardness of the board core, wherein the average core hardness is measured according to ASTM C-473-07, e.g., at least about 2 times greater, 2.5 times greater, 3 times greater, 3.5 times greater, 4 times greater, 4.5 times greater, etc., wherein each of these ranges can have any mathematically appropriate upper limit, such as, for example, 8, 7, 6, 5, 4, 3, or 2.

With respect to flexural strength, in some embodiments, when cast in a board of ½ inch thickness, the dry board has a flexural strength of at least about 36 $lb_f$ in a machine direction (e.g., at least about 38 $lb_f$, at least about 40 $lb_f$, etc.) and/or at least about 107 $lb_f$ (e.g., at least about 110 $lb_f$, at least about 112 $lb_f$, etc.) in a cross-machine direction as determined according to the ASTM standard $C_{473}$-07. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

Advantageously, in various embodiments at various board densities as described herein, the dry composite gypsum board can have a compressive strength of at least about 170 psi (1,170 kPa), e.g., from about 170 psi to about 1,000 psi (6,900 kPa), from about 170 psi to about 900 psi (6,200 kPa), from about 170 psi to about 800 psi (5,500 kPa), from about 170 psi to about 700 psi (4,800 kPa), from about 170 psi to about 600 psi (4,100 kPa), from about 170 psi to about 500 psi (3,450 kPa), from about 170 psi to about 450 psi (3,100 kPa), from about 170 psi to about 400 psi (2,760 kPa), from about 170 psi to about 350 psi (2,410 kPa), from about 170 psi to about 300 psi (2,070 kPa), or from about 170 psi to about 250 psi (1,720 kPa). In some embodiments, the board has a compressive strength of at least about 450 psi (3,100 kPa), at least about 500 psi (3,450 kPa), at least about 550 psi (3,800 kPa), at least about 600 psi (4,100 kPa), at least about 650 psi (4,500 kPa), at least about 700 psi (4,800 kPa), at least about 750 psi (5,200 kPa), at least about 800 psi (5,500 kPa), at least about 850 psi (5,850 kPa), at least about 900 psi (6,200 kPa), at least about 950 psi (6,550 kPa), or at least about 1,000 psi (6,900 kPa). In addition, in some embodiments, the compressive strength can be bound by any two of the foregoing points. For example, the compressive strength can be between about 450 psi and about 1,000 psi (e.g., between about 500 psi and about 900 psi, between about 600 psi and about 800 psi, etc.). The compressive strength as used herein is measured using a materials testing system commercially available as ATS machine model 1610, from Applied Test Systems in Butler, PA The load is applied continuously and without a shock at speed of 1 inch/min.

Composite gypsum board according to embodiments of the disclosure can be made on typical gypsum wallboard manufacturing lines. For example, board manufacturing techniques are described in, for example, U.S. Pat. No. 7,364,676, U.S. Patent Application Publication 2010/0247937, and U.S. patent application Ser. No. 16/581,070. Briefly, the process typically involves discharging a cover sheet onto a moving conveyor. Since gypsum board is normally formed "face down," this cover sheet is the "face" cover sheet in such embodiments.

The slurries for forming the board core and for forming the skim coat layer can be formed in any suitable manner. For example, one mixer can be used to develop both slurry streams. The mixer can be e.g., in the form of "pin mixers" or "pin-less mixers" as desired where the raw materials are agitated. Alternatively, two separate mixers can be used. The mixers can be in series or unconnected. Examples of mixers are described in European Patent 1 637 302 B1, European Patent 2 929 996 B1, European Patent Application 3 342 571 A1, and U.S. Patent Application 2017/0008192 A1. If desired for efficiency, the mixer used for the skim coat layer(s) can have a smaller mixing volume capacity in some embodiments since the amount of slurry needed to be applied for the skim coat layer is less than the amount of slurry that is applied to form the board core. The "main" mixer (i.e., for forming the board core slurry) comprises a main body and a discharge conduit (e.g., a gate-canister-boot arrangement as known in the art, or a modified outlet design (MOD) arrangement as described in U.S. Pat. Nos. 6,494,609 and 6,874,930). Foaming agent and/or core starch can be added in the discharge conduit of the mixer (e.g., in the gate as described, for example, in U.S. Pat. Nos. 5,683,635 and 6,494,609).

In single mixer embodiments, a skim coat stream can exit through a port and outlet in the main body of the mixer, i.e., upstream of the discharge conduit. The skim coat outlet is provided with one or more inlets to allow for introduction of the skim coat starch and any other desired ingredients that vary from the board core slurry exiting the discharge conduit of the mixer. Where the foaming agent is inserted in the discharge conduit, the amount of foaming agent will be reduced or avoided in the skim coat stream since it is removed upstream of where the foaming agent is added, thereby allowing for an increased density in the skim coat layer as desired. If foaming agent is present in the skim coat stream, it can be beaten out by techniques known in the art. In preferred embodiments, the back skim coat layer is formed from the skim coat stream. The face skim coat layer also can be formed from the skim coat stream if desired. In some embodiments, however, the face skim coat layer can be formed from the slurry stream exiting the discharge conduit, which stream is also used to form the board core. Any foam therein can be beaten out if desired to increase the density of the face skim coat layer relative to the board core.

In some embodiments, it will be understood that the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1.

Board is formed in a sandwich structure, normally concurrently and continuously, as will be understood in the art. The face cover sheet travels as a continuous ribbon on a moving conveyor. After being discharged from its mixer, a skim coat layer slurry is applied to the moving face cover sheet. This slurry can include the skim coat starch as described herein. Also, hard edges, as known in the art, can be formed, e.g., from the same slurry stream forming the skim coat layer (e.g., the back skim coat layer) for convenience, if desired.

The board core slurry is then applied over the skim coat layer and covered with a second cover sheet (typically the "back" cover sheet) to form a wet assembly in the form of a sandwich structure that is a board precursor to the final product. The back (bottom) cover sheet bears a second skim coat layer, which contains the inventive starch as described herein to enhance bonding between the back paper and the board core. The second skim coat layer can be formed from the same or different gypsum slurry as for the first skim coat layer. In some embodiments, the skim coat layer is applied on the back side of the board, i.e., in bonding relation to the bottom cover sheet but no skim coat layer is applied between the core and the top cover sheet.

In some embodiments, the face paper (which is face down at the wet end of the board machine) can be made to be slightly wider than the width of the final board product since the edges of the paper can be folded up and over the edges of the board to meet the back paper (face up at the wet end of the board machine) to form a board envelope. For example, for nominal 48 inch wide board, the face paper can have a width of about 50 inches or more (e.g., from about 50 to about 52 inches, such as about 50.375 inches). Correspondingly, in some embodiments, the back paper can be made to be narrower than the width of the board. Thus, for nominal 48 inch wide board, the back paper can have a width of less than about 48 inches (e.g., from about 46.5 inches to about 47.5 inches, such as about 47.125 inches).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

It also is common in the manufacture of gypsum board to use vibration in order to eliminate large voids or air pockets from the deposited slurry. Each of the above steps, as well as processes and equipment for performing such steps, are known in the art The invention is further illustrated by the following exemplary clauses. However, the invention is not limited by the following clauses.

(1) A composite gypsum board comprising: (a) a board core comprising set gypsum formed from a first slurry comprising water and stucco containing a high salt impurity content, the core defining first and second core faces. The first slurry can contain other ingredients as desired, such as foaming agents, core starch, dispersants, accelerators, retarders, polyphosphates, etc.; (b) a skim coat layer defining first and second skim coat faces, the skim coat formed from a second slurry comprising water, the stucco, and a starch, the skim coat disposed in bonding relation to the first core face; and (c) a back cover sheet, the first face of the skim coat layer facing the back cover sheet, and the second face of the skim coat layer facing the board core, wherein the starch enhances the bond between the board core and the back cover sheet.

(2) The composite gypsum board of clause 1, wherein the board further comprises a face cover sheet, the second face of the board core facing the face cover sheet.

(3) The composite gypsum board of clause 2, wherein the board further comprises: a second skim coat layer defining first and second faces, the second skim coat layer formed from a third slurry comprising water, the stucco, and, the skim coat starch, the first face of the second skim coat layer facing the second face of the board core, and the second face of the second skim coat layer facing the second cover sheet, wherein the skim coat starch enhances the bond between the board core and the face cover sheet, and the second and third slurries can be the same or different.

(4) The composite gypsum board of any one of clauses 1-3, wherein the first and/or second skim coat layer has a dry thickness of from about 0.125 inches (⅛ inch) to about 0.016 inches (1/64 inch), such as from about 0.08 inches (1/12 inch) to about 0.03 inches (1/32 inch).

(5) The composite gypsum board of any one of clauses 1-4, wherein the skim coat starch is present in an amount of from about 0.3% to about 8.0% by weight of the stucco, e.g., from about 1.0% to about 4.0% by weight of the stucco, in the second and/or third slurries.

(6) The composite gypsum board of any one of clauses 1-5, wherein the high salt impurity comprises at least about 150 ppm chloride anion per 1,000,000 parts by weight of said calcium sulfate hemihydrate.

(7) The composite gypsum board of any one of clauses 1-6, wherein the salt impurity comprises a chloride salt, such as sodium chloride, magnesium chloride, or calcium chloride.

(8) The composite gypsum board of any one of clauses 1-7, wherein the first slurry comprises core starch comprising a pregelatinized starch and/or a migrating starch having a molecular weight of about 6,000 Daltons or less.

(9) The composite gypsum board of any one of clauses 1-8, wherein the skim coat starch includes an uncooked starch having (i) a hot water viscosity of from about 20 BU to about 300 BU according to the hot water viscosity assay (HWVA method), and/or (ii) a mid-range peak viscosity of from about 120 BU to 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(10) The composite gypsum board of any one of clauses 1-9, wherein the skim coat starch includes a pregelatinized starch having a viscosity of from about 20 centipoise to about 700 centipoise (such as from about 20 centipoise to about 300 centipoise or from about 30 centipoise to about 200 centipoise) when the viscosity is measured while the starch is subjected to conditions according to the VMA method.

(11) A method of making composite gypsum board, the method comprising: (a) mixing at least water and stucco containing a high salt impurity content to form a slurry. The first slurry can contain other ingredients as desired, such as foaming agents, core starch, dispersants, accelerators, retarders, polyphosphates, etc.; (b) mixing water, stucco, and, optionally a skim coat starch to form a face skim coat slurry; (c) disposing the face skim coat slurry in a bonding relation to a face cover sheet to form a face composite having a slurry surface and a cover sheet surface; (d) disposing the core slurry in a bonding relation to face composite to form a core composite, the core slurry forming a board core having a first and second faces, the first face facing the slurry surface of the face composite; (e) mixing water, stucco, and skim coat starch to form a back skim coat slurry, wherein the face and back skim coat slurries can be the same or different; (f) disposing the back skim slurry in bonding relation to a back cover sheet to form a back composite having a slurry surface and a cover sheet surface; (g) disposing the back composite in a bonding relation to the core composite to form a board precursor, wherein the slurry surface of the back composite faces the second face of the core; and (h) drying the board precursor to form a board, wherein the skim coat starch enhances the bond between the board core and the back cover sheet, and optionally between the board core and the first cover sheet.

(12) The method of clause 11, wherein the core starch is pregelatinized starch in an amount of from about 0.5% to about 1.5% by weight of the stucco, and the skim coat starch is uncooked starch in an amount of from about 1.5% to about 5% by weight of the stucco.

(13) The method of clause 11 or 12, wherein the first and/or second skim coat layer has a dry thickness of from about 0.125 inches (⅛ inch) to about 0.016 inches (1/64 inches), such as from about 0.08 inches (1/12 inch) to about 0.03 inches (1/32 inch).

(14) The method of any one of clauses 11-13, wherein the skim coat starch is present in an amount of from about 0.3% to about 8.0% by weight of the stucco, e.g., from about 1.0% to about 4.0% by weight of the stucco, in the second and/or third slurries.

(15) The method of any one of clauses 11-14, wherein the first slurry comprises at least about 150 ppm chloride anions per 1,000,000 parts by weight of said calcium sulfate hemihydrate.

(16) The method of any one of clauses 11-15, wherein the salt impurity is a chloride salt, such as sodium chloride, magnesium chloride, or calcium chloride.

(17) The method of any one of clauses 11-16, wherein the core starch includes a pregelatinized starch and/or a migrating starch having a molecular weight of about 6,000 Daltons or less.

(18) The method of any one of clauses 11-17, wherein the skim coat starch includes an uncooked starch having (i) a hot water viscosity of from about 20 BU to about 300 BU according to the hot water viscosity assay (HWVA method), and/or (ii) a mid-range peak viscosity of from about 120 BU to 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(19) The method of any one of clauses 11-18, wherein the skim coat starch includes a pregelatinized starch having a viscosity of from about 20 centipoise to about 700 centipoise (such as from about 20 centipoise to about 300 centipoise or from about 30 centipoise to about 200 centipoise) when the viscosity is measured while the starch is subjected to conditions according to the VMA method.

It shall be noted that the preceding clauses are illustrative and not limiting. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

This example demonstrates the effect of the presence of starch in a gypsum layer on the bond between a cover sheet and the gypsum layer in gypsum wallboard prepared using a stucco slurry containing a high salt content.

Sixteen gypsum wallboard samples having the dimensions of 12 inches×12 inches were prepared in accordance with the formulations set forth in Tables 1-4. The thickness of the sample boards was ½ inch. Control boards (without high salt content in the stucco slurry) were used as comparatives. Boards prepared from high salt (chloride) stucco were tested both with and without starch in the gypsum layer. The source of the chloride anion (Cl$^-$) is one of sodium chloride (NaCl), magnesium chloride ($MgCl_2$), and calcium chloride ($CaCl_2$), as identified in the tables.

In the tables, "HRA" is heat resistant accelerator. "Pregelatinized starch" refers to a pregelatinized corn flour starch with a cold water viscosity of 90 centipoise. "Uncooked starch" refers to an uncooked acid-modified corn starch having a hot water viscosity of 180 BU. "Migrating starch" refers to a small chain starch, LC211, commercially available from ADM. All amounts are in grams unless otherwise indicated.

TABLE 1

Formulation for gypsum layer (with NaCl)

| Ingredients (g) | Board Sample 1A (Control) | Board Sample 1B (Control-10 lb Uncooked Starch) |
|---|---|---|
| Stucco | 900 | 900 |
| HRA | 3.6 | 3.6 |
| Pregelatinized Starch | 2.7 | 2.7 |
| Uncooked Starch | — | 9 |
| Fiberglass | 2.5 | 2.5 |
| NaCl | 0 | 0 |

TABLE 2

Formulation for gypsum layer (with NaCl)

| Ingredients (g) | Board Sample 2A (Control) | Board Sample 2B (2000 ppm NaCl) | Board Sample 3B (2000 ppm NaCl-20 lb Uncooked Starch) |
|---|---|---|---|
| Stucco | 900 | 900 | 900 |
| HRA | 3.6 | 3.6 | 3.6 |
| Pregelatinized Starch | 2.7 | 2.7 | 2.7 |
| Uncooked Starch | — | — | 18 |
| Fiberglass | 2.5 | 2.5 | 2.5 |
| NaCl | 0 | 3.3 | 3.3 |

TABLE 3

Formulation for gypsum layer (with NaCl (salt)); Uncooked Starch vs. Migrating Starch (LC211))

| Ingredients (g) | Board Sample 3A (0 ppm NaCl) | Board Sample 3B (600 ppm NaCl) | Board Sample 3C (600 ppm NaCl-10 lb Uncooked Starch) | Board Sample 3D (600 ppm NaCl-20 lb Uncooked Starch) | Board Sample 3E (600 ppm NaCl-20 lb Migrating Starch) |
|---|---|---|---|---|---|
| Stucco | 800 | 800 | 800 | 800 | 800 |
| HRA | 11 | 11 | 11 | 11 | 11 |
| Pregelatinized Starch | 5.5 | 5.5 | 5.5 | 5.5 | 5.5 |
| Uncooked Starch | — | — | 8 | 16 | — |
| Migrating Starch (LC211) | — | — | — | — | 16 |
| NaCl | — | 0.79 | 0.79 | 0.79 | 0.79 |

TABLE 4

Formulation for gypsum layer (NaCl vs MgCl$_2$ vs CaCl$_2$)

| Ingredients (g) | Sample Board 4A (NaCl-1500 ppm) | Sample Board 4B (NaCl-1500 ppm-10 lb Uncooked) | Sample Board 4C (CaCl$_2$-800 ppm) | Sample Board 4D (CaCl$_2$-800 ppm-10 lb Migrating Starch) | Sample Board 4E (MgCl$_2$-3000 ppm) | Sample Board 4F (MgCl$_2$-3000 ppm-20 lb Migrating Starch) |
|---|---|---|---|---|---|---|
| Stucco | 800 | 800 | 800 | 800 | 800 | 800 |
| HRA | 11 | 11 | 11 | 11 | 11 | 11 |
| Pregelatinized Starch | 5.5 | 5.5 | 5.5 | 5.5 | 5.5 | 5.5 |
| Uncooked Starch | 0 | 8 | — | — | — | — |
| Migrating Starch (LC211) | — | — | 0 | 8 | 0 | 16 |
| CaCl$_2$•2H$_2$O | — | — | 1.33 | 1.33 | — | — |
| MgCl$_2$ | — | — | — | — | 3.23 | 3.23 |
| NaCl | 1.99 | 1.99 | — | — | — | — |

12 inches×12 inches×½ inch envelopes were made by using Manila paper (46 lb/msf) as a face paper and Newsline paper (40 lb/msf) as a back paper. The slurry was prepared by soaking dry powders in the solution for 10 seconds and mixing for 10 seconds in a Hobart mixer, followed by injecting the foam for 5.5 seconds and mixing another 2 seconds. The slurry was poured into the 12 inches×12 inches×½ inch envelopes. After the slurry was set and hardened, the envelope was sealed by using a paper tape. The sealed board was dried at 450° F. for 15 minutes, then moved to 350° F. oven. After being dried at 350° F. for 20 minutes, the board was further dried at 110° F. for 16 hours.

The dried 12 inches×12 inches×½ inch boards were cut into 4 of 6 inches×5 inches×½ inch small pieces (the 5 inches being in the production line direction). A one eight inch-deep straight score was made in the face surface of the board sample 2.5" from and parallel to one of the 6 inch edges. The boards were then conditioned at 75° F. with 50% relative humidity (RH) for 24 hours, then placed in a room at 90° F. with 90% relative humidity (RH). The humidified bonds were tested after 3 hours and 16 hours, respectively according to the humidified board test as follows.

The humidified board was snapped along the score without breaking or stressing the paper on the back side of the board, and the larger (2.5"×6") piece of the board sample was then rotated and forced downward with its face surface up, in an attempt to force the back paper on the back side of the board to peel away from the larger pieces. The force was increased until the two board pieces came completely apart. The back surface of the larger piece was then examined to determine the percentage of the surface of the back paper that had pulled completely away from the core (referred to as "% failure").

For Samples 2A, 2B, and 2C, the wet bonds were measured. After the casted boards were dried at 450° F. for 15 minutes, the boards were cut into 4 of 6 inches×5 inches×½ inch small pieces. The wet bond of two of 6 inches×5 inches×½ inch small pieces were immediately measured, and the other two were further dried at 350° F. for 20 minutes and at 110° F. for 16 hours.

Figure 2B:
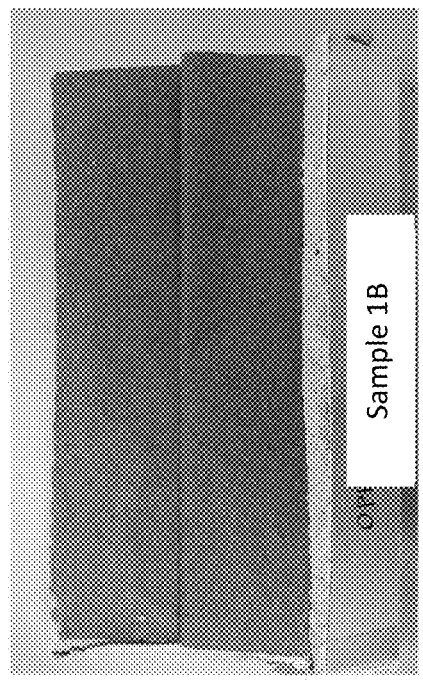
FIGS. 2A and 2B are photographs of two boards after bond testing as discussed in Example 1.
Figure 2A:
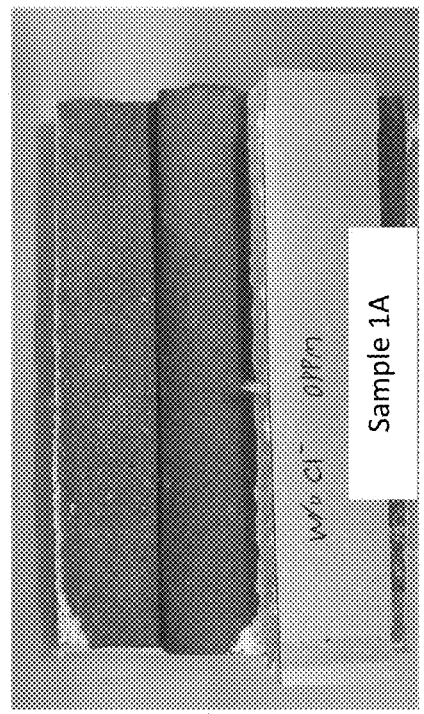

Table 5 shows the three hour humidified bond from Samples 1A and 1B. FIGS. 2A and 2B are images showing the bonds after the test. As seen in FIGS. 2A and 2B, Samples 1A and 1B show good paper-to-gypsum layer bond, with no paper peeling observed, while Sample 1B had a higher humidified bond (18.6 lbs) than the Control Sample 1A (13.1 lbs), as shown in Table 5.

TABLE 5

Three Hour 90/90 Humidified Bond

| Board Sample | 1A | 1B |
|---|---|---|
| Load (lbs) - Back side | 13.1 | 18.6 |
| Failure (%) - Back side | 0 | 0 |

Figure 3A:
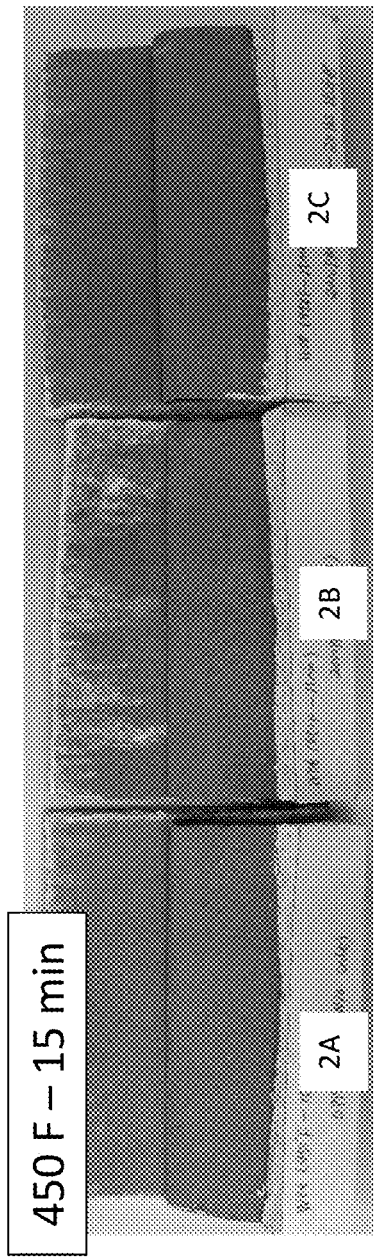
FIGS. 3A and 3B are photographs of three boards after bond testing as discussed in Example 1.
Figure 3B:
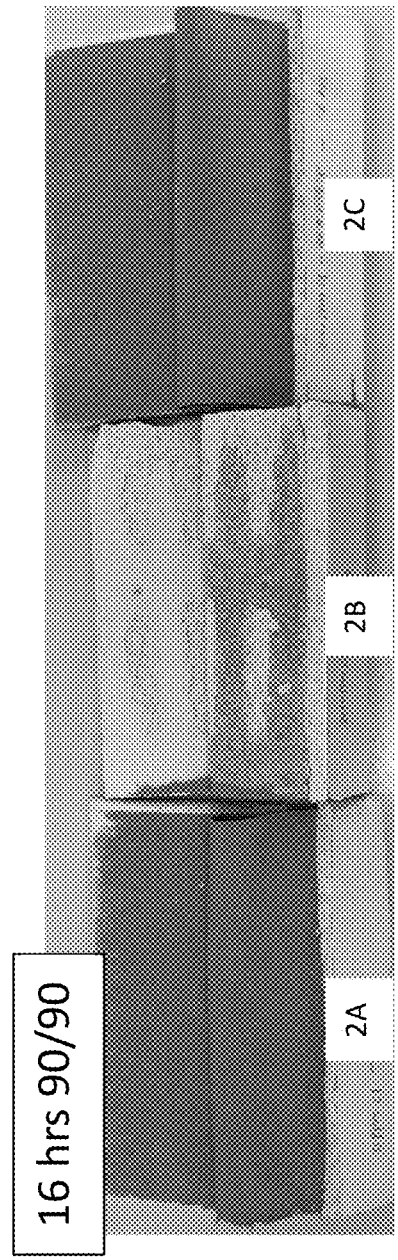

Tables 6A and 6B set forth the wet bond and 16 hour humidified bond results for Samples 2A, 2B, and 2C. FIGS. 3A and 3B include images showing the boards after the wet bond and 16 hour humidified bond tests. Sample 2B exhibited a poor wet bond and 16 hour humidified bonds due to a high concentration of the salt (2000 ppm Cl). Sample 2C exhibited a higher wet bond and 16 hour humidified bond as compared with Sample 2B, indicating that the addition of uncooked starch improved the bond between the paper and the gypsum layer. As seen in FIGS. 3A and 3B, no paper peeling is observed in Sample 2A and 2C, but 50% of paper failure is found in Sample 2B.

TABLE 6A

Wet Bond

| Sample Board | 2A | 2B | 2C |
|---|---|---|---|
| Load (lbs) - Back side | 5.2 | 4.6 | 9 |
| Failure (%) - Back side | 0 | 50 | 0 |

TABLE 6B

16 Hour 90/90 Humidified Bond

| Sample Board | 2A | 2B | 2C |
|---|---|---|---|
| Load (lbs) - Back side | 9.4 | 7.4 | 9.8 |
| Failure (%) - Back side | 0 | 100 | 0 |

Figure 4A:
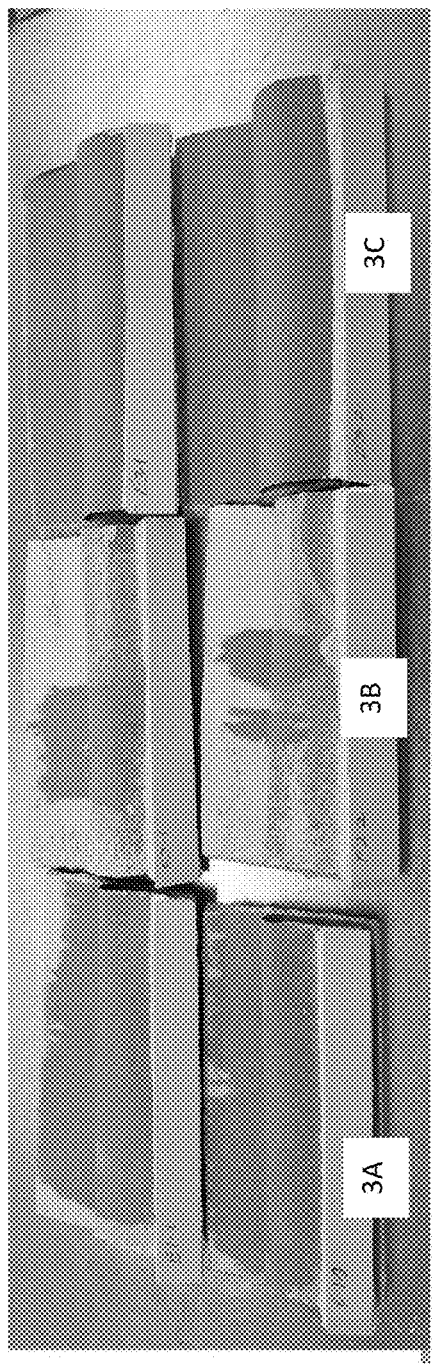
FIGS. 4A and 4B are photographs of three boards after bond testing as discussed in Example 1.
Figure 4B:
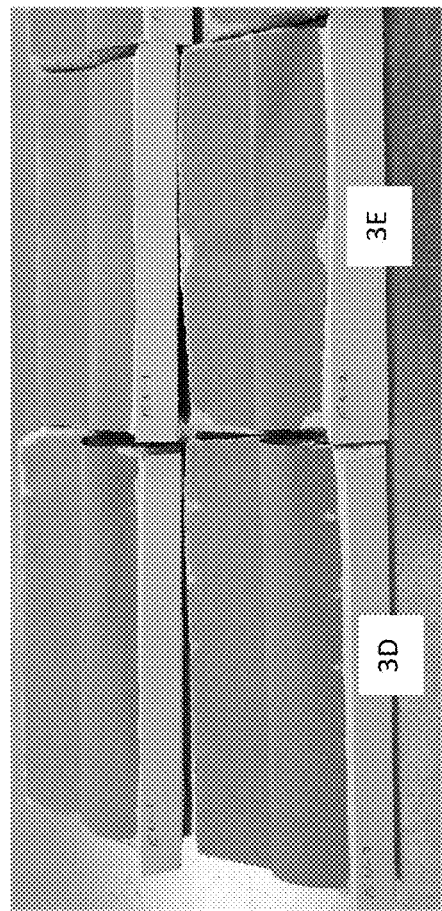

Table 7 shows the effect of different starch (uncooked starch vs migrating starch) on three hour humidified bonds from Samples 3A, 3B, 3C, 3D, and 3E. FIGS. 4A and 4B include images showing the boards after three hour humidified bond tests. Sample 3B demonstrated a poor three hour humidified bond due to a high concentration of salt (600 ppm Cl). Samples 3C, 3D, and 3E exhibited good bonding between the paper and the gypsum layer, indicating that the addition of either uncooked starch or migrating starch is able to improve the bond between paper and gypsum layer. As seen in FIGS. 4A and 4B, no paper peeling is observed from Samples 3A, 3C, 3D and 3E, while poor paper peeling is observed in Sample 3B.

TABLE 7

Three Hour 90/90 Humidified Bond

| Board Sample | 3A | 3B | 3C | 3D | 3E |
|---|---|---|---|---|---|
| Load (lbs) - Back side | 13.1 | 7.4 | 18.3 | 18.2 | 14.9 |
| Failure (%) - Back side | 0 | 70 | 0 | 0 | 5 |

Figure 5A:
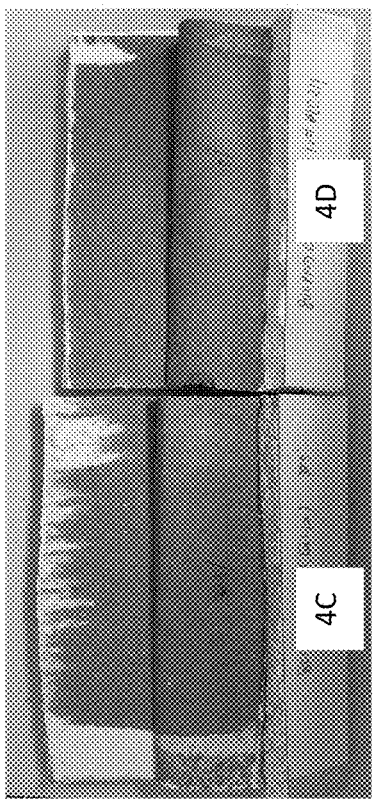
FIGS. 5A-5C are photographs of three boards after bond testing as discussed in Example 1.
Figure 5B:
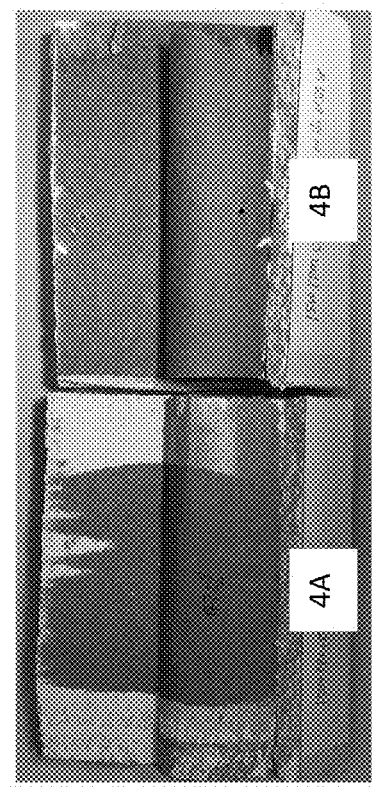
Figure 5C:
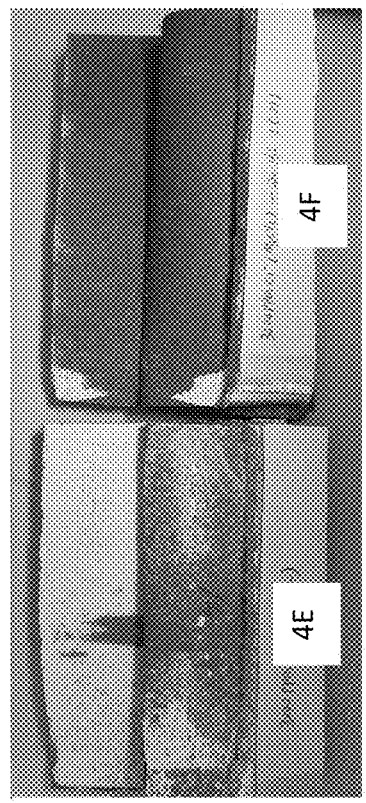

Table 8 shows the effect of different salts on three hour humidified bonds in Samples 4A, 4B, 4C, 4D, 4E, and 4F. FIGS. 5A-5C include images illustrating the bonds after three hour humidified bond tests. Samples 4A, 4C, and 4E showed poor three hour humidified bonds due to the existence of different salts, NaCl, $CaCl_2$ and $MgCl_2$. Samples 4B, 4D, and 4F showed good bonds, indicating that the addition of either uncooked starch or migrating starch greatly improved the bond between paper and the gypsum layer. As seen in FIGS. 5A-5C, by adding starch in Sample 4B, 4D and 4F, no obvious paper peeling is observed. However, Samples 4A, 4C and 4D show poor paper peeling.

TABLE 8

Three Hour 90/90 Humidified Bond

| Board Sample | 4A | 4B | 4C | 4D | 4E | 4F |
|---|---|---|---|---|---|---|
| Load (lbs)-Back side | 7.9 | 13.4 | 6.1 | 11.3 | 5.6 | 12.2 |
| Failure (%)-Back side | 47.5 | 0 | 32.5 | 5 | 95 | 5 |

In various embodiments, the starch can be native starch, pregelatinized starch, or the combination of native and pregelatinized starch. In some embodiments, it is preferable to add the starch in the top skim coat layer, and/or the bottom skim coat layer. However, the starch can be added into the core as well.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite gypsum board comprising:
   (a) a board core comprising set gypsum formed from a first slurry comprising water and stucco containing a salt impurity comprising at least about 150 ppm chloride anion per 1,000,000 parts by weight of stucco, the core defining first and second core faces;
   (b) a first skim coat layer defining first and second skim coat faces, the first skim coat layer formed from a second slurry comprising water, the stucco, and a skim coat starch, the first skim coat layer disposed in bonding relation to the first core face, wherein the skim coat starch comprises (i) an uncooked starch having a hot water viscosity of from about 20 BU to about 300 BU; (ii) an uncooked starch having a mid-range peak viscosity of from about 120 BU to 1000 BU; and/or (iii) a pregelatinized starch, wherein the second slurry excludes a migrating starch having a molecular weight of about 6,000 Daltons or less prior to disposing the first skim coat layer in bonding relation to the first core face; and
   (c) a back cover sheet, the first face of the first skim coat layer facing the back cover sheet, and the second face of the first skim coat layer facing the board core, wherein the skim coat starch enhances the bond between the board core and the back cover sheet, as compared with the board prepared without the skim coat starch;
   wherein the board has a density of 35 pcf or less.

2. The composite gypsum board of claim 1, wherein the board further comprises a face cover sheet, the second face of the board core facing the face cover sheet.

3. The composite gypsum board of claim 2, wherein the board further comprises:
   a second skim coat layer defining first and second faces, the second skim coat layer formed from a third slurry comprising water, the stucco, and, the skim coat starch, the first face of the second skim coat layer facing the second face of the board core, and the second face of the second skim coat layer facing the second cover sheet,
   wherein the skim coat starch enhances the bond between the board core and the face cover sheet, and the second and third slurries can be the same or different.

4. The composite gypsum board of claim 1, wherein the first and/or second skim coat layer has a dry thickness of from about 0.125 inches (⅛ inch) to about 0.016 inches (¹⁄₆₄ inch).

5. The composite gypsum board of claim 1, wherein the skim coat starch is present in an amount of from about 0.3% to about 8.0% by weight of the stucco in the second and/or third slurries.

6. The composite gypsum board of claim 2, wherein the board further comprises:
   a second skim coat layer defining first and second faces, the second skim coat layer formed from a third slurry comprising water and the stucco, and excluding the skim coat starch,
   the first face of the second skim coat layer facing the second face of the board core, and the second face of the second skim coat layer facing the second cover sheet.

7. The composite gypsum board of claim 1, wherein the salt impurity is sodium chloride, magnesium chloride, calcium chloride, or any combination thereof.

8. The composite gypsum board of claim 1, wherein the first slurry comprises core starch comprising a pregelatinized starch and/or a migrating starch having a molecular weight of about 6,000 Daltons or less.

9. The composite gypsum board of claim 1, wherein the skim coat starch includes a pregelatinized starch having a viscosity of from about 20 centipoise to about 700 centipoise when the viscosity is measured while the starch is subjected to conditions according to the VMA method.

10. The composite gypsum board of claim 1, wherein the board has a humidified bond load of greater than 13 lbs when the humidified bond load is measured while the board is subjected to conditions according to the humidified bond test.

11. The composite gypsum board of claim 1, wherein the board has a humidified bond load at least 18 lbs when the humidified bond load is measured while the board is subjected to conditions according to the humidified bond test.

12. The composite gypsum board of claim 1, wherein the board has a wet bond load of greater than 5 lbs when the wet bond load is measured while the board is subjected to conditions according to the wet bond test.

13. The composite gypsum board of claim 1, wherein the board has a wet bond load of at least 9 lbs when the wet bond load is measured while the board is subjected to conditions according to the wet bond test.

14. A method of making composite gypsum board, the method comprising:
   (a) mixing at least water and stucco containing a salt impurity comprising at least about 150 ppm chloride anion per 1,000,000 parts by weight of stucco to form a core slurry;
   (b) mixing at least water, stucco, and, optionally a skim coat starch to form a face skim coat slurry, wherein, if present, the skim coat starch in the face skim coat slurry comprises (i) an uncooked starch having a hot water viscosity of from about 20 BU to about 300 BU; (ii) an uncooked starch having a mid-range peak viscosity of from about 120 BU to 1000 BU; and/or (iii) a pregelatinized starch;

(c) disposing the face skim coat slurry in a bonding relation to a face cover sheet to form a face composite having a slurry surface and a cover sheet surface;

(d) disposing the core slurry in a bonding relation to the face composite to form a core composite, the core slurry forming a board core having first and second faces, the first face facing the slurry surface of the face composite, wherein the face skim coat slurry excludes a migrating starch having a molecular weight of about 6,000 Daltons or less prior to disposing the skim coat in bonding relation to the first core face;

(e) mixing water, stucco, and skim coat starch to form a back skim coat slurry, wherein the face and back skim coat slurries can be the same or different, the skim coat starch in the back skim coat slurry comprising (i) an uncooked starch having a hot water viscosity of from about 20 BU to about 300 BU; (ii) an uncooked starch having a mid-range peak viscosity of from about 120 BU to 1000 BU; and/or (iii) a pregelatinized starch;

(f) disposing the back skim slurry in bonding relation to a back cover sheet to form a back composite having a slurry surface and a cover sheet surface;

(g) disposing the back composite in a bonding relation to the core composite to form a board precursor, wherein the slurry surface of the back composite faces the second face of the core, wherein the back skim coat slurry excludes a migrating starch having a molecular weight of about 6,000 Daltons or less prior to disposing the back composite in bonding relation to the second core face; and (h) drying the board precursor to form a board, wherein the skim coat starch enhances the bond between the board core and the back cover sheet, and optionally between the board core and the first cover sheet, as compared with the board prepared without the skim coat starch;

wherein the board has a density of 35 pcf or less.

15. The method of claim 14, wherein the core starch is pregelatinized starch in an amount of from about 0.5% to about 1.5% by weight of the stucco, and the skim coat starch is uncooked starch in an amount of from about 1.5% to about 5% by weight of the stucco.

16. The method of claim 14, wherein the face skim coat slurry and the back skim coat slurry form a first skim coat layer and a back skim coat layer, respectively, upon the drying, and wherein the face and/or back skim coat layers have coat layer has a dry thickness of from about 0.125 inches (⅛ inch) to about 0.016 inches (1/64 inches).

17. The method of claim 14, wherein the skim coat starch is present in an amount of from about 0.3% to about 8.0% by weight of the stucco in the face skim coat and/or back skim coat slurries.

18. The method of claim 14, wherein the salt impurity comprises sodium chloride, magnesium chloride, calcium chloride, or any combination thereof.

19. The method of claim 14, wherein the core starch includes a pregelatinized starch and/or a migrating starch having a molecular weight of about 6,000 Daltons or less.

20. The method of claim 14, wherein the skim coat starch includes a pregelatinized starch having a viscosity of from about 20 centipoise to about 700 centipoise when the viscosity is measured while the starch is subjected to conditions according to the VMA method.

* * * * *

UNITED STATES PATENT AND TRADEMARK OFFICE
CERTIFICATE OF CORRECTION

PATENT NO. : 11,993,054 B2
APPLICATION NO. : 16/904729
DATED : May 28, 2024
INVENTOR(S) : Li et al.

It is certified that error appears in the above-identified patent and that said Letters Patent is hereby corrected as shown below:

In the Claims

In Column 26, Line 8: "The composite gypsum board of claim 1" should read: -- The composite gypsum board of claim 3 --.

In Column 26, Line 12: "The composite gypsum board of claim 1" should read: -- The composite gypsum board of claim 3 --.

Signed and Sealed this
Twentieth Day of August, 2024

Katherine Kelly Vidal
*Director of the United States Patent and Trademark Office*